W. B. COCHRANE.
ELECTRIC LIGHT FIXTURE.
APPLICATION FILED APR. 12, 1915.
1,182,351.
Patented May 9, 1916.
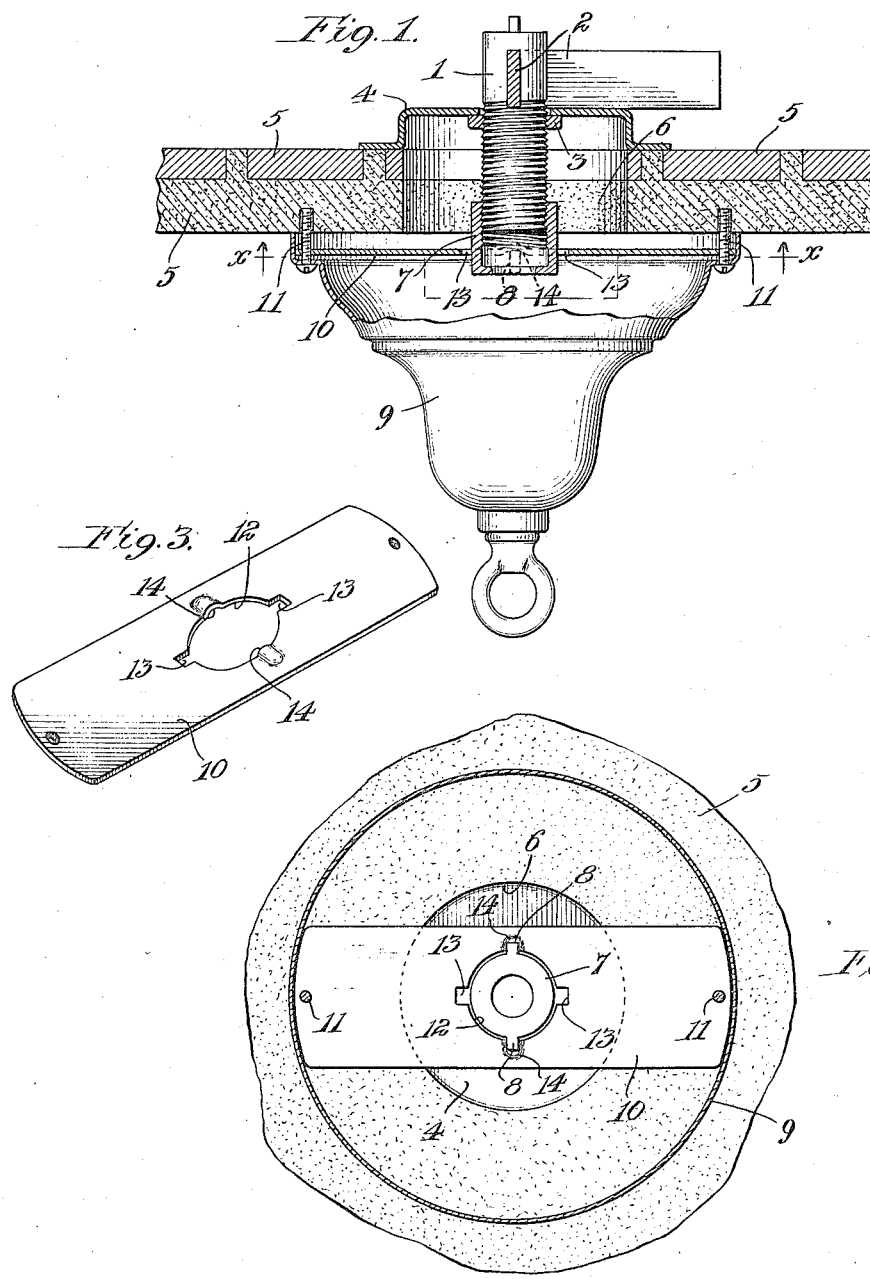
Witnesses:
H. S. Bull
A. A. Olson
Inventor:
William B. Cochrane,
by Joshua R. H. Potts
his Attorney.

UNITED STATES PATENT OFFICE.

WILLIAM B. COCHRANE, OF CHICAGO, ILLINOIS.

ELECTRIC-LIGHT FIXTURE.

1,182,351.     Specification of Letters Patent.     Patented May 9, 1916.

Application filed April 12, 1915. Serial No. 20,919.

*To all whom it may concern:*

Be it known that I, WILLIAM B. COCHRANE, a citizen of the United States, and a resident of the city of Chicago, county of Cook, and State of Illinois, have invented certain new and useful Improvements in Electric-Light Fixtures, of which the following is a specification.

My invention relates to electric light fixtures and more specifically to means for attaching the light support to the anchoring device mounted in the wall or ceiling.

The object of my invention is the production of a device of the character mentioned through the medium of which a light support may be readily and easily connected with the anchoring element in the wall or ceiling, a further object being the production of an arrangement which will be of durable and economical construction and efficient in use.

Other objects will appear hereinafter.

The invention consists in the combinations and arrangements of parts hereinafter described and claimed.

The invention will be best understood by reference to the accompanying drawing forming a part of this specification, and in which, Figure 1 is a partial sectional side elevation of a fixture embodying my invention, the same being shown applied to a ceiling, Fig. 2 is a section taken on substantially line *x—x* of Fig. 1, and Fig. 3 is a perspective view of the yoke which is included in the construction, detached.

The preferred form of construction, as illustrated in the drawing, is employed in conjunction with the usual anchoring member 1 which is in the form of a threaded nipple or stud, said member being mounted at its upper end upon a supporting bar 2 which is adapted, when the device is in use, to be fastened at its ends to the joists or studding of the ceiling or wall in conjunction with which the fixture is employed. On said member 1 is also threaded a nut 3 which serves to secure a plate or cup 4 thereto. The member 4 engages against the inner side of the wall or ceiling 5, being adapted to cover the opening 6 which is formed in the latter at the point of application of the fixture, as is generally understood by those skilled in the art. Threaded upon the outer end of the anchoring member 1 is an end piece 7 provided at its outer end with laterally projecting diametric studs 8.

The light supporting member or canopy 9 which it is desired to fasten to the anchoring member 1 is provided at its inner side with a yoke 10 which is simply a substantially rectangular plate formed of spring metal. The ends of the yoke 10 are connected with the opposite sides of the member 9 by means of screws 11 which pass loosely through the member 9 and which are threaded into the ends of said yoke, as clearly shown in Fig. 1. With this arrangement, it will be seen that, the position of said yoke relative to the base portion of the supporting member 9 may be adjusted through rotary adjustment of said screws. The inner ends of the screws 11 after said screws have been threaded into the yoke 10 are upset or enlarged as shown, in order to lock the same in engagement with said yoke and prevent accidental disengagement of the latter from said screws.

Formed centrally in the yoke 10 is an opening 12 of a size adapting the same to snugly receive the end piece 7, as clearly shown in Fig. 2. Formed in the edge of opening 12 are diametric slots 13 adapted to permit of the passage of the studs 8 when the same are positioned in registration therewith. The arrangement is such, as will be seen, that after passage of the studs 8 through the slots 13, upon rotary adjustment of the member 9 and hence the yoke 10, the slots 13 will be carried out of registration with said studs and thus serve to lock said yoke and hence the supporting member 9 in engagement with the end piece 7 of the anchoring device. Formed in the under side of the plate 10 intermediate the slots 13 are diametric recesses or depressions 14 adapted for engagement with the studs 8 in order to hold the yoke against relative movement after the same has been adjusted to carry the slots thereof out of registration with said studs. After adjustment of the yoke 10 to the position last mentioned, the same may be pressed into secure engagement with the studs 8 through adjustment of the screws 11. Upon positive rotation of said screws it will be seen that the member 9 will first be elevated until the upper edge thereof contacts with the adjacent side of the wall or ceiling 5, whereupon continued rotation of said screws will cause the ends of the yoke 10 to be drawn downwardly, thereby pressing the central portion of the yoke securely against the studs 8 with the result of rigidly locking the supporting member 9 to the anchoring element 1. The yoke being thus in a flexed condition, in case of any shrinkage of the parts with which the supporting member 9 engages, this shinkage will be compensated for by the resiliency of said yoke and the member 9 still held secure. This, of course, would not be the case were all of the parts of the fixture and especially the yoke of non-resilient construction, it being clear that in the latter case, upon shrinkage of the parts with which the supporting member 9 engaged, the latter would be loosened and would drop from engagement with the ceiling or the part against which the same had been engaging.

By loosely threading the end piece 7 upon the outer end of anchoring member 1, the studs 8 may be adjusted so as to properly position the same relative to walls or ceilings of various thicknesses, it being clear that in order for the yoke to interlock with said studs, it is necessary that the latter be positioned beyond the plane of the under or outer surface of the wall or ceiling in conjunction with which the device is employed.

The construction set forth is simple and economical and affords means of readily and expeditiously mounting or removing a light fixture.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A device of the class described comprising an anchoring element; a supporting device; means for connecting said supporting device with said anchoring element, said means comprising studs projecting laterally from said anchoring element; a resilient yoke on said supporting device having an opening to permit of the passage of said anchoring element, there being slots at the edges of said opening to permit of the passage of said studs, said member being rotatably adjustable relative to said anchoring element; and means engaging with the ends of said yoke adapted to move the latter into secure engagement with said studs after rotary adjustment of said yoke to position the slots thereof out of registration with said studs, substantially as described.

2. A device of the class described comprising an anchoring element; a supporting device; means for connecting said supporting device with said anchoring element, said means comprising studs projecting laterally from said anchoring element; a resilient yoke on said supporting device having an opening to permit of the passage of said anchoring element, there being slots at the edges of said opening to permit of the passage of said studs, said members being rotatably adjustable relative to said anchoring element; and screws engaging with the ends of said yoke adapted to move the latter into secure engagement with said studs after rotary adjustment of said yoke to position the slots thereof out of registration with said studs, substantially as described.

3. A device of the class described comprising an anchoring element; a supporting device; means for connecting said supporting device with said anchoring element, said means comprising studs projecting laterally from said anchoring element; a resilient yoke on said supporting device having an opening to permit of the passage of said anchoring element, there being slots at the edges of said opening to permit of the passage of said studs, said member being rotatably adjustable relative to said anchoring element; and screws loosely rotatable in said supporting device and threaded into the ends of said yoke for moving the latter into secure engagement with said studs after rotary adjustment of said yoke to position the slots thereof out of registration with said studs, substantially as described.

4. A device of the class described comprising an anchoring element; a supporting device; means for connecting said supporting device with said anchoring element, said means comprising studs projecting laterally from said anchoring element; a resilient yoke on said supporting device having an opening to permit of the passage of said anchoring element, there being slots at the edges of said opening to permit of the passage of said studs, said member being rotatably adjustable relative to said anchoring element; and screws loosely rotatable in said supporting device and threaded into the ends of said yoke for moving the latter into secure engagement with said studs after rotary adjustment of said yoke to position the slots thereof out of registration with said studs, the inner ends of said screws being enlarged to lock the same against disengagement from said yoke, substantially as described.

5. A device of the class described comprising an anchoring element; a supporting device; means for connecting said supporting device with said anchoring element, said means comprising an end piece on said anchoring device longitudinally adjustable thereon; laterally projecting studs on said end piece; a yoke on said supporting device having an opening to permit of the passage and said end piece, there being slots at the edges of said opening to permit of the passage of said studs, said member being rotatably adjustable relative to said end piece; and means engaging with the ends of said yoke adapted to move the latter into secure engagement with said studs after rotary adjustment of the latter to position the slots thereof out of registration with said studs, substantially as described.

6. A device of the class described comprising an anchoring element; a supporting device; means for connecting said supporting device with said anchoring element, said means comprising an end piece loosely threaded on said anchoring element; laterally projecting studs on said end piece; a yoke on said supporting device having an opening to permit of the passage of said end piece, there being slots at the edges of said opening to permit of the passage of said studs, said member being rotatably adjustable relative to said end piece; and means engaging the ends of said yoke adapted to move the latter into secure engagement with said studs after rotary adjustment of said yoke to position the slots thereof out of registration with said studs, substantially as described.

7. A device of the class described comprising an anchoring element; a supporting device; means for connecting said supporting device with said anchoring element, said means comprising an end piece on said anchoring device longitudinally adjustable thereon; laterally projecting studs on said end piece; a yoke on said supporting device having an opening to permit of the passage of said end piece, there being slots at the edges of said opening to permit of the passage of said studs, said member being rotatably adjustable relative to said end piece; and screws loosely rotatable in said supporting device and threaded into the ends of said yoke for adjusting the position of the latter in said supporting device, substantially as described.

In testimony whereof I have signed my name to this specification in the presence of two subscribing witnesses.

WILLIAM B. COCHRANE.

Witnesses:
JOSHUA R. H. POTTS,
HELEN F. LILLIS.